(12) United States Patent
Lohmar et al.

(10) Patent No.: US 10,601,886 B2
(45) Date of Patent: Mar. 24, 2020

(54) METHOD, A USER EQUIPMENT AND A COMPUTER PROGRAM PRODUCT FOR ENABLING A DYNAMIC ADAPTIVE STREAMING OVER HTTP, DASH, PLAYER TO FETCH MEDIA SEGMENTS FROM A NETWORK

(71) Applicant: Telefonaktiebolaget LM Ericsson (publ), Stockholm (SE)

(72) Inventors: Thorsten Lohmar, Aachen (DE); Jie Ling, Shanghai (CN); Jinyang Xie, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/757,586

(22) PCT Filed: Feb. 5, 2018

(86) PCT No.: PCT/CN2018/075303
§ 371 (c)(1),
(2) Date: Mar. 5, 2018

(87) PCT Pub. No.: WO2019/148498
PCT Pub. Date: Aug. 8, 2019

(65) Prior Publication Data
US 2019/0379719 A1    Dec. 12, 2019

(51) Int. Cl.
*H04L 29/06* (2006.01)
*H04L 29/08* (2006.01)

(52) U.S. Cl.
CPC ........ *H04L 65/604* (2013.01); *H04L 65/4076* (2013.01); *H04L 67/02* (2013.01)

(58) Field of Classification Search
CPC .... H04L 65/604; H04L 65/4076; H04L 67/02
See application file for complete search history.

(56) References Cited

U.S. PATENT DOCUMENTS

| | | | |
|---|---|---|---|
| 10,313,408 B2* | 6/2019 | Phillips | ................. H04W 4/029 |
| 2015/0032899 A1* | 1/2015 | Willars | ............... H04L 65/4076 |
| | | | 709/231 |

(Continued)

FOREIGN PATENT DOCUMENTS

| CN | 101860720 A | 10/2010 |
|---|---|---|
| CN | 102598691 A | 7/2012 |

(Continued)

OTHER PUBLICATIONS

Kleinrouweler et al., "Using DASH Assisting Network Elements for Optimizing Video Streaming Quality," Session: Doctoral Symposium, MM'17, Oct. 23-27, 2017, Mountain View, CA, USA (Year: 2017).*

(Continued)

*Primary Examiner* — Alina A Boutah
(74) *Attorney, Agent, or Firm* — Murphy, Bilak & Homiller, PLLC

(57) ABSTRACT

A method of enabling a Dynamic Adaptive Streaming over HTTP, DASH, player to fetch media segments from a network, wherein said method comprises the steps of receiving, by a DASH Aware Network Element, DANE, middleware, from said network, a manifest, wherein said manifest comprises a representation base Uniform Resource Identifier, URI, for indicating a location to said DASH player for fetching said media segments, a default representation base URI which is available in a default mode for fetching said media segments from a default content delivery network, CDN, a secondary representation base URI which is available in a secondary mode for fetching said media segments from a secondary CDN, transmitting, by said DANE middleware, said manifest to said DASH player, transmitting, by said DANE middleware, to said DASH player, a Manifest-ModificationCommand message, wherein said Manifest-ModificationCommand message comprises one or more (Continued)

representation base URI's of any of said default representation base URI and said secondary representation base URI that are to modify a representation base URI in said manifest.

22 Claims, 5 Drawing Sheets

(56) References Cited

U.S. PATENT DOCUMENTS

| | | | | |
|---|---|---|---|---|
| 2015/0200992 | A1* | 7/2015 | Houdaille | H04L 65/80 |
| | | | | 709/219 |
| 2015/0319210 | A1* | 11/2015 | Chen | H04L 65/607 |
| | | | | 709/219 |
| 2016/0072637 | A1* | 3/2016 | Gholmieh | H04L 65/4076 |
| | | | | 709/219 |
| 2016/0277466 | A1* | 9/2016 | Lohmar | H04L 65/4084 |
| 2016/0330500 | A1* | 11/2016 | Houdaille | H04L 65/4084 |
| 2016/0373546 | A1* | 12/2016 | Lotfallah | H04L 65/4084 |
| 2017/0019445 | A1 | 1/2017 | Panje | |
| 2018/0199075 | A1* | 7/2018 | Wang | H04N 21/23439 |
| 2018/0316740 | A1* | 11/2018 | Stockhammer | H04L 29/06 |
| 2018/0332089 | A1* | 11/2018 | Lohmar | H04L 63/0428 |
| 2018/0367592 | A1* | 12/2018 | Thomas | H04L 65/608 |
| 2019/0045260 | A1* | 2/2019 | Klenner | H04N 21/23805 |
| 2019/0174161 | A1* | 6/2019 | Skupin | H04N 21/4728 |
| 2019/0230142 | A1* | 7/2019 | He | H04L 65/4084 |
| 2019/0313144 | A1* | 10/2019 | Stokking | H04N 21/6587 |

FOREIGN PATENT DOCUMENTS

| | | |
|---|---|---|
| CN | 104661052 A | 5/2015 |
| CN | 104980416 A | 10/2015 |

OTHER PUBLICATIONS

Modifying a Manifest File (The Java™ Tutorials > Deployment > Packaging Programs in JAR Files) (Year: 2019).*

3GPP, "3rd Generation Partnership Project; Technical Specification Group Services and System Aspects; Multimedia Broadcast/Multicast Service (MBMS) User service guidelines (Release 14)", 3GPP TR 26.946 V14.0.0, Mar. 2017, 1-47.

3GPP, "3rd Generation Partnership Project; Technical Specification Group Services and System Aspects; Multimedia Broadcast/Multicast Service (MBMS); Protocols and codecs (Release 15)", 3GPP TS 26.346 V15.0.0, Dec. 2017, 1-279.

3GPP, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 15)", 3GPP TS 26.247 V15.1.0, Dec. 2017, 1-128.

* cited by examiner

METHOD, A USER EQUIPMENT AND A COMPUTER PROGRAM PRODUCT FOR ENABLING A DYNAMIC ADAPTIVE STREAMING OVER HTTP, DASH, PLAYER TO FETCH MEDIA SEGMENTS FROM A NETWORK

TECHNICAL FIELD

The present invention generally relates to DASH players and, more specifically, to a method for switching between a default content delivery network and a secondary content delivery network for fetching media segments.

BACKGROUND

Multimedia Broadcast Multicast Services, MBMS, is a point-to-multipoint interface specification for existing and upcoming 3GPP cellular networks. The interface specification is developed to provide for an efficient delivery of broadcast and multicast services. The specification is referred to as Evolved Multimedia Broadcast Multicast Services, eMBMS, when transmissions are delivered through an Long Term Evolution, LTE, network. eMBMS is also known as LTE Broadcast.

Typical application that may utilize the MBMS include radio broadcasting, live streaming video, mobile television, as well as file delivery and emergency alerts.

The third generation Partnership Project, 3GPP, has defined Multimedia Broadcast Multicast Services, MBMS, operation on Demand, MooD, within 3GPP Release 12. The prescribed solution is based on a Device Local HTTP Proxy Server, which is capable of forwarding media content received from a unicast content delivery network or from a broadcast content delivery network. A Moving Picture Experts Group, MPEG, Server and Network Assisted Dynamic Adaptive Streaming over HTTP, MPEG-DASH, based solution was studied and documented, informatively, in TR 26.946.

However, that 3GPP Device-Proxy solution has not been implemented, since the performance requirements on the device were considered too high. MPEG SAND has introduced server and network assistant DASH and is defined in MPEG as ISO/IEC 23009-5. SAND defines a set of messages, which can be used for QoE reporting and network assistance, for example:
  Parameters Enhancing Reception, PER, messages that are sent from a DANE to a DASH client, and
  Status messages that are sent from DASH clients to DANEs Some SAND messages have been adopted in 3GPP, see for example 26.247. Work is currently on-going to use a SAND out-of-band DANE to enable switching between unicast and broadcast (MooD). Parts of the prescribed solution is, informatively, described in TR 26.946-Section 7.2.4.

The prescribed SAND solution for switching between unicast and broadcast works in principle as follows:
  The DASH Media Presentation Description, MPD, for example an XML document containing information about media segments, contains multiple representations. Some representations are only available for unicast retrieval. Some other representations are available for unicast retrieval and are also broadcasted inside of an MBMS coverage area.
  The MBMS User Service Description, USD, contains information around switchable representations. The idea is that the DANE controls, which representations are available, when the device is in broadcast coverage and which ones not.
  When starting the Streaming session, the DASH Player opens a SAND communication channel to the DANE, which is aware about unicast and broadcast coverage. The DASH Player is the steered using SAND PER messages.

The current SAND based MooD solution, as documented in TR 26.946 and currently specified into TS 26.247 and TS 26.346, requires a prepared manifest (MPD). This manifest is called unified MPD. The manifest contains an absolute base URL so that the segments can be fetched from a different server than the manifest. Further, the manifest must contain unique based URLs for a local server and a remote server.

Formally, the Broadcast Multicast Service Center, BM-SC, is responsible to create and provide the unified MPD, including all the extra elements, to the MBMS User Equipment. Some of the information is the hostname of the local HTTP server. Every device vendor may select an own hostname, depending on other local services. Further, when only a subset of the representations of the manifest are broadcasted, i.e. in contrast to alternative representations, then the BM-SC would need to condition the manifest only to describe the broadcasted available representations.

At this stage, it is necessary to insert extra base URLs, so that certain representations or sets of representations can be controlled.

It is however preferred that the BM-SC or the MBMS client do not condition the manifest, i.e. for this particular switching situation between unicast and broadcast.

The problem may also be phrased more general. Many SAND messages require a unique identification of representations inside the manifest. The packager is responsible of creating the manifest according to the produced content. It seems to become a restriction and unnecessary constrain to require, that the packager creates a SAND compliant manifest, with all the SAND specific information in it. It is also not preferred to condition the manifest.

SUMMARY

It is an object of the present disclosure to provide for methods for enabling a DASH player to switch between a default content delivery network and a secondary content delivery network to fetch media segments.

It is another object to provide for a User Equipment, UE, arranged for enabling a DASH player to switch between a default content delivery network and a secondary content delivery network to fetch media segments.

It is a further object to provide for a computer program product containing computer program code, which computer program code facilitates any of the methods in accordance with the present disclosure.

In a first aspect of the present disclosure, there is provided a method of enabling a Dynamic Adaptive Streaming over HTTP, DASH, player to fetch media segments from a network. The method comprises the steps of:
  receiving, by a DASH Aware Network Element, DANE, middleware, from said network:
    a manifest, wherein said manifest comprises a representation base Uniform Resource Identifier, URI, for indicating a location to said DASH player for fetching said media segments;

a default representation base URI which is available in a default mode for fetching said media segments from a default content delivery network, CDN;

a secondary representation base URI which is available in a secondary mode for fetching said media segments from a secondary CDN;

transmitting, by said DANE middleware, said manifest to said DASH player;

transmitting, by said DANE middleware, to said DASH player, a ManifestModificationCommand message, wherein said ManifestModificationCommand message comprises one or more representation base URI's of any of said default representation base URI and said secondary representation base URI that are to modify a representation base URI in said manifest.

The basic concept of the present disclosure is that the DANE middleware does not need to alter the manifest. The DANE middleware transmits a ManifestModificationCommand to the DASH player, thereby instructing the DASH player to modify the representation base URI's in the manifest.

The above ensures that the manifest still contains unique identification of representations. As such, the DANE middleware may request the DASH player to update, modify or extend the representation base URI in the manifest whenever there is a switch required between the source of the media segments, i.e. between a default content delivery network and a secondary content delivery network.

The above is valid for situations in which there is a switch between a unicast content delivery network and a broadcast content delivery network or between multi unicast content delivery networks or between multi broadcast content delivery networks. The DANE middleware is able to steer the DASH player by making the specific media segments available, or unavailable, at the default content delivery network or the secondary content delivery network.

The manifest may be in MPD format as received from a particular server, for example an XML file, or in DASH Player internal representation. Typically, a DASH Player parses the manifest in a first step and then brings the manifest into a generic software-internal representation, like a hierarchical organized object. MPEG-DASH allows several different manifest types.

The advantage of the present disclosure is that the need for manifest conditioning for the DANE middleware is reduced. Instead, only a SAND channel may be defined, inside of the manifest or outside, and the DANE middleware can interact with the DASH player to add, modify or extend missing identifiers.

In an example, the method further comprises the step of:
receiving, by said DANE middleware, from said DASH player, a ManifestModificationRequest message for requesting a modification of said manifest.

The DASH player may, actively, request the DANE middleware for a modification of the manifest. For example, the DASH player may notice that it is not able to fetch particular media segments from a default content delivery CDN. As a result, it may request a manifest modification from the DANE middleware.

Alternatively, the DANE middleware may push the modification of the manifest towards the DASH player.

In a further example, the DANE middleware comprises a Multimedia Broadcast Multicast Service, MBMS, client for receiving said manifest, said default representation base URI and said secondary representation base URI, wherein:
said default representation base URI is a broadcast representation base URI which is available in a broadcast mode for fetching said media segments from a broadcast content delivery network, CDN;

said secondary representation base URI is a unicast representation base URI which is available in a unicast mode for fetching said media segments from a unicast content delivery network, CDN.

The above is directed to the example in which the default content delivery network is a broadcast CDN and wherein the secondary content delivery network is a unicast CDN.

In a further example, the step of transmitting said manifest to said DASH player comprises defining a Server and Network Assisted DASH, SAND, channel between said DASH player and said DANE middleware.

Here, the step of defining may comprise any of:
defining a SAND channel based on HTTP GET transactions thereby enabling said DASH player to pull SAND messages from said DANE middleware;
defining a SAND channel based on WebSockets thereby enabling said MBMS middleware to push messages to said DASH player.

In another example, the method further comprises the step of:
receiving, from said DASH player, a SAND message for multi content delivery network operations for checking resource availability for said representation base URI in said manifest, said method further comprises any of the steps of:
informing said DASH player, by said DANE middleware, that said secondary representation base URI is available in case default mode is unavailable and secondary mode is available;
informing said DASH player, by said DANE middleware, that said default base URI corresponding is available in case default mode is available.

In a second aspect, there is provided a method for a Dynamic Adaptive Streaming over HTTP, DASH, player to fetch media segments from a telecommunication network, wherein said method comprises the steps of:
receiving, by said DASH player, from a DASH Aware Network Element, DANE, middleware:
a manifest, wherein said manifest comprises a representation base Uniform Resource Identifier, URI, for indicating a location to said DASH player for fetching said media segments;
receiving, by said DASH player, from said DANE middleware, a ManifestModificationCommand message comprising one or more representation base URI's of any of:
a default representation base URI which is available in a default mode for fetching said media segments from a default content delivery network, CDN;
a secondary representation base URI which is available in a secondary mode for fetching said media segments from a secondary CDN;
which default representation base URI or secondary representation base URI are to modify a representation base URI in said manifest.

modifying, by said DASH player, said representation base URI in said manifest based on said ManifestModificationCommand message.

The advantages of the first aspect of the disclosure are also inherently a part of the second aspect of the disclosure. Furthermore, it is pointed out that although the claims read as if all the equipment according to the present disclosure are incorporated into a single node, a person skilled in the art understands that the same disclosure could be implemented by, distributing the equipment over several nodes.

In an example, the method further comprises the step of: transmitting, by said DASH player, to said DANE middleware, a ManifestModificationRequest message for requesting a modification of said manifest.

In another example, the step of receiving said manifest from said DANE middleware comprises defining a Server and Network Assisted DASH, SAND, channel between said DASH player and said DANE middleware.

In yet another example, the step of defining comprises any of:
  defining a SAND channel based on HTTP GET transactions thereby enabling said DASH player to pull SAND messages from said DANE middleware;
  defining a SAND channel based on WebSockets thereby enabling said DANE middleware to push messages to said DASH player.

In an example, the method further comprises the step of: transmitting, by said DASH player, to said DANE middleware, a SAND message for multi content delivery network operations for checking resource availability for said representation base URI in said manifest,
said method further comprises any of the steps of:
  receiving, by said DASH player, from said DANE middleware, information that said secondary representation base URI is available in case default mode is unavailable and secondary mode is available;
  receiving, by said DASH player, from said DANE middleware, information that said default representation base URI is available in case default mode available.

In a third aspect of the present disclosure, there is provided a User Equipment, UE, arranged for enabling a Dynamic Adaptive Streaming over HTTP, DASH, player to fetch media segments from a network, wherein said UE comprises DASH Aware Network Element, DASH, middleware comprising:
  receive equipment arranged for receiving from said network:
    a manifest, wherein said manifest comprises a representation base Uniform Resource Identifier, URI, for indicating a location to said DASH player for fetching said media segments;
    a default representation base URI which is available in default mode for fetching said media segments from a default content delivery network, CDN;
    a secondary representation base URI which is available in secondary mode for fetching said media segments from a secondary CDN;
  transmit equipment arranged for transmitting said manifest to said DASH player, and for transmitting, to said DASH player, a ManifestModificationCommand message, wherein said ManifestModificationCommand message comprises one or more representation base URI's of any of said default representation base URI and said secondary representation base URI that are to modify a representation base URI in said manifest.

In an example, the receive equipment is further arranged for receiving, from said DASH player, a ManifestModificationRequest message for requesting a modification of said manifest.

In a further example, said transmit equipment is further arranged for defining a Server and Network Assisted DASH, SAND, channel between said DASH player and said DANE middleware.

In an example the transmit equipment is arranged for defining said SAND channel by:
  defining a SAND channel based on HTTP GET transactions thereby enabling said DASH player to pull SAND messages from said DANE middleware;
  defining a SAND channel based on WebSockets thereby enabling said MBMS middleware to push messages to said DASH player.

In another example, the DANE middleware comprises a Multimedia Broadcast Multicast Service, MBMS, client for receiving said manifest, said default representation base URI and said secondary representation base URI, wherein:
  said default representation base URI is a broadcast representation base URI which is available in a broadcast mode for fetching said media segments from a broadcast content delivery network, CDN;
  said secondary representation base URI is a unicast representation base URI which is available in a unicast mode for fetching said media segments from a unicast content delivery network, CDN.

In an example, the receive equipment is further arranged for receiving, from said DASH player, a SAND message for multi content delivery network operations for checking resource availability for said representation base URI in said manifest,
and wherein said DANE middleware further comprises inform equipment arranged for any of:
  informing said DASH player that said secondary representation base URI is available in case default mode is unavailable and secondary mode is available;
  informing said DASH player that said default representation base URI corresponding available in case default mode available.

In a fourth aspect, there is provided a User Equipment, UE, arranged to fetch media segments from a network, said UE comprises a Dynamic Adaptive Streaming over HTTP, DASH, player which comprises:
  receive equipment arranged for receiving from a DASH Aware Network Element, DANE, middleware:
    a manifest, wherein said manifest comprises a representation base Uniform Resource Identifier, URI, for indicating a location to said DASH player for fetching said media segments;
  wherein said receive equipment is further arranged for receiving, from said DANE middleware, a ManifestModificationCommand message comprising one or more representation base URI's of any of a
    a default representation base URI which is available in default mode for fetching said media segments from a default Content Delivery Network, CDN;
    a secondary representation base URI which is available in secondary mode for fetching said media segments from a secondary CDN;
    which one or more representation base URI's are to modify a representation base URI in said manifest.
  modify equipment arranged for modifying said representation base URI in said manifest based on said ManifestModificationCommand message.

In an example, the UE further comprises transmit equipment arranged for
  transmitting, to said DANE middleware, a ManifestModificationRequest message for requesting a modification of said manifest.

In another example, the receive equipment is further arranged for receiving said manifest from said DANE middleware by defining a Server and Network Assisted DASH, SAND, channel between said DASH player and said DANE middleware.

In a further example, the defining comprises any of:
defining a SAND channel based on HTTR GET transactions thereby enabling said DASH player to pull SAND messages from said MBMS middleware;
defining a SAND channel based on WebSockets thereby enabling said MBMS middleware to push messages to said DASH player.

In an example, the UE comprises transmit equipment arranged for transmitting, to said DANE middleware, a SAND message for multi content delivery network operations for checking resource availability for said representation base URI in said manifest, and wherein said receive equipment is further arranged for receiving, from said DANE middleware, information that said secondary representation base URI is available in case secondary mode is unavailable and default mode is available;

and wherein said receive equipment is further arranged for receiving, from said DANE middleware, information that said default representation base URI is available in case default mode available.

In a fifth aspect, there is provided a computer program product containing computer program code which, when executed by a User Equipment, UE, cause the UE to implement a method according to any of the examples as provided above.

DETAILED DESCRIPTION

Figure 1:
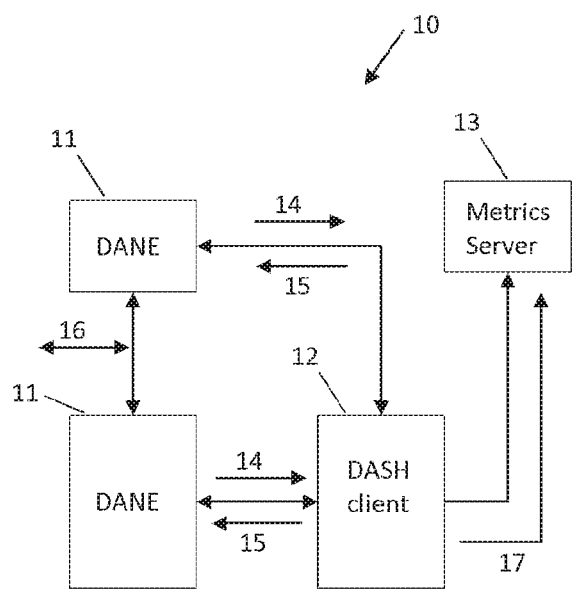
FIG. 1 discloses an architecture enabling the exchange of SAND messages.

FIG. 1 discloses an architecture 10 enabling the exchange of SAND messages.

The architecture 10 comprises a metrics server 13, a DASH client 12 and two DANE's 11. SAND defines a set of messages, which can be used for Quality of Experience, QoE, reporting.

Here, Parameters Enhancing Reception, PER, messages 14 are sent from the DANE's 11 to the DASH client 12. Status messages 15 are sent from the DASH client 12 to the DANE's. Other SAND messages, like PED messages 16 and metrics messages 17, are exchanged between the DANE's 11 and between the DASH client 12 and the Metrics server 13, respectively.

SAND messages have been adopted in 3GPP which are focused on the use of a SAND out-of-band DANE to enable switching between unicast, for example a default content delivery network, and broadcast, for example a secondary content delivery network.

Figure 2:
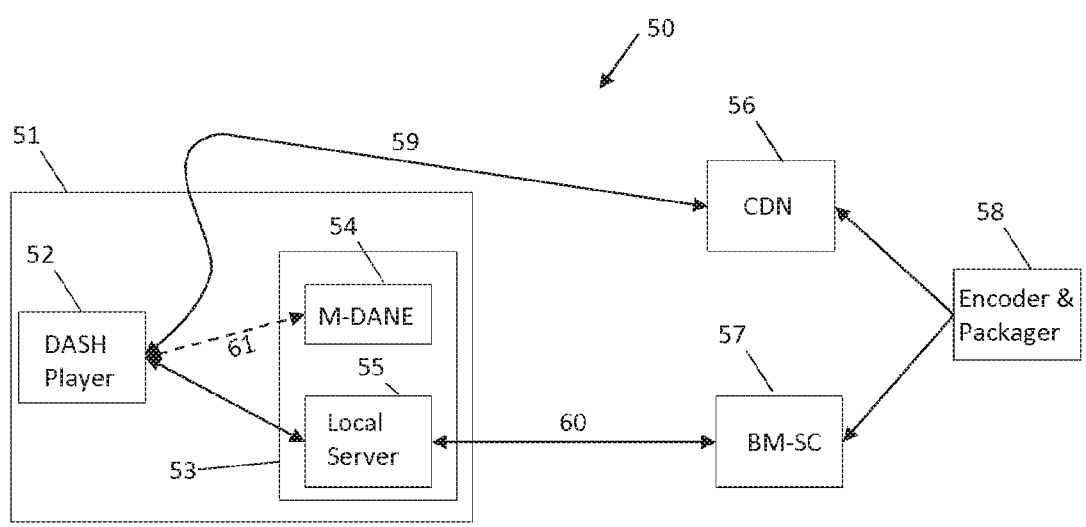
FIG. 2 discloses an architecture in which a particular device is able to switch between a default content delivery network and a secondary content delivery network.

FIG. 2 discloses an architecture 50 in which a particular device 51 is able to switch between a default content delivery network 56 and a secondary content delivery network 57, which all of those originate from an encoder and packager 58. The architecture 50 is explained in more detail here below.

First, it is noted that a manifest is required by the DASH player 52 to fetch the media segments from a content delivery network. The manifest contains a base URL so that the segments may be fetched from a different server.

Typically, the Broadcast Multicast Service Center, BM-SC 57, is responsible for creating the manifest and for providing the manifest to the local server 55 of an MBMS client 53. The DASH player 52 may communicate with the local server 55, and may communicate with the DANE 54 using, for example, SAND messages.

In case there is a need to switch between broadcast 60 and unicast 59, additional base URLs are required in the manifest. The secondary content delivery network 56 is responsible, in unicast mode, 59, to provide for the media segments.

Figure 3:
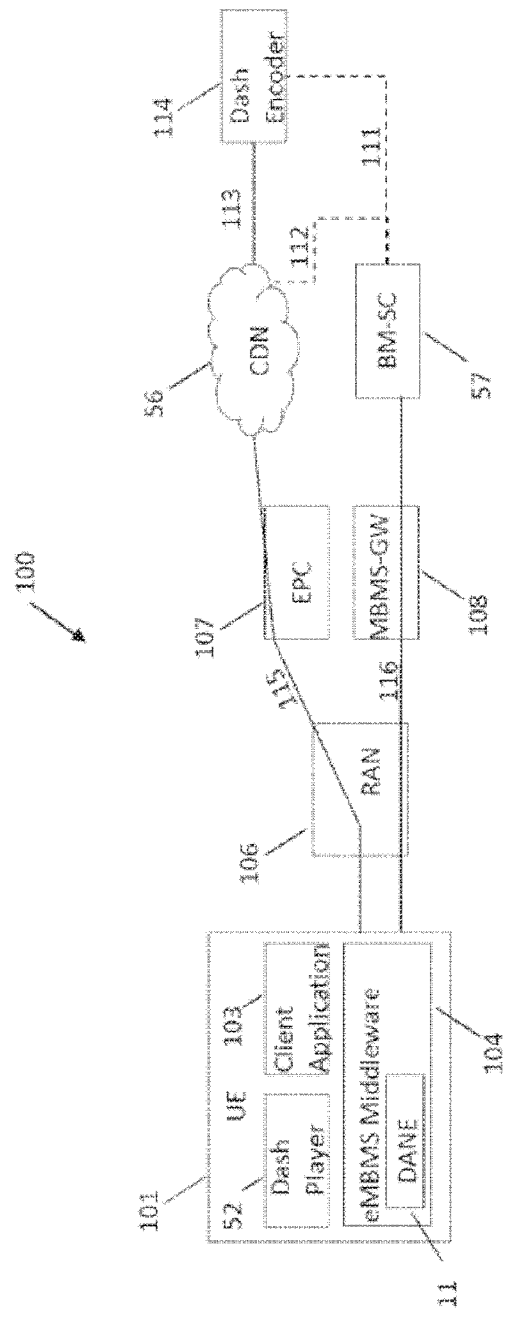
FIG. 3 discloses an architecture in which an embodiment according to the present disclosure is explained.

FIG. 3 discloses an architecture 100 in which an embodiment according to the present disclosure is explained.

The UE 101 comprises a DASH player 52, a client application 103 and a DANE middleware 104, 11.

The DASH content encoder 114 is responsible for the encoding of the content and for pushing the manifest, for example an XML file, to the content delivery network An operator will select one track for the broadcasting. Dash Encoding may put the selected track segment files to BM-SC 57, or the BM-SC 57 will pull the segment file from the CDN 56.

The operator may create the broadcast service, and may send the service announcement to the corresponding UEs through the broadcast delivery or unicast delivery, i.e. via the CDN 56 of the BM-SC 57. The service announcement may include the original manifest, source URIs for the broadcast and unicast access.

The UE may receive the service announcement, and may consume the service based on the broadcast coverage to use the unicast access or broadcast access.

In the present scenario, the broadcast mode may be viewed as the default content delivery network and the unicast mode may be viewed as the secondary content delivery network. In the end, the media segments may be provided to the UE 101 using the RAN 106 via which the UE 101 is connected to the network, i.e. the Evolved Packet Core, EPC<107 or the MBMS-GW 108.

It is noted that the present disclosure is focused on the definition of additional base URI's, so that the DAN is able to control the DASH player to fetch the content from another content delivery network.

The DANE may pull PER messages from the DANE or the DAN may push PER messages to the DASH player. In the following, we assume that the DASH player is to pull PER messages from the DANE.

In a first step, The DASH Player 52 may receives a manifest, which may define a SAND communication channel between the DASH player 52 and the DANE 11. Note, the SAND channel may be defined inside of the manifest or as part of, for example, HTTP response headers.

In a second step, the DASH player 52 may send a ManifestModificationRequest SAND PER message to the DANE 11. Such a message requests the DAN player for a modification of the manifest. The message may be sent, by the DASH player 11, in case it has found issues with obtaining the media segments from a particular content delivery network, for example.

The DANE 11 may then generate and transmit a ManifestModificationCommand message, wherein that particular message comprises one or more representation base URI's of a default representation base URI and a secondary representation base URI that is to modify a representation base URI in the manifest. In other words, the DANE 11 provides a message to the DASH player 11 instructing the dash player to use a different location for fetching the media segments compared to the location that is actually present in the manifest.

As a fourth step, the DASH player 52 receives the ManifestModificationCommand message and the DASh player 52 amends the manifest accordingly.

Figure 4:
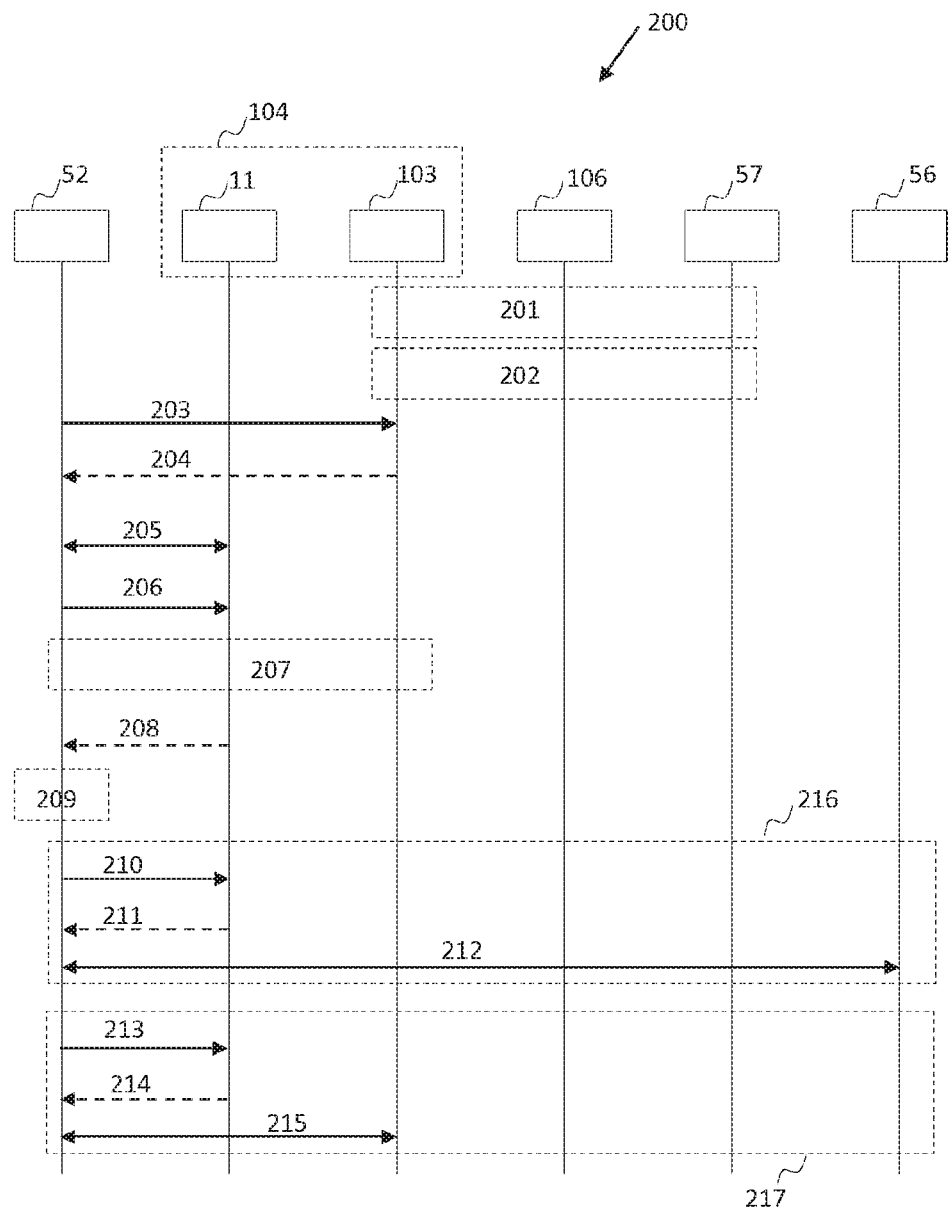
FIG. 4 discloses a workflow describing an example of how DASH a player, a DANE and MBMS Client work together with network entities to achieve the MooD and service continuity.

FIG. 4 discloses a workflow describing an example of how DASH a player, a DANE and MBMS Client work together with network entities to achieve the MooD and service continuity.

Here, the DAS player is indicated with reference numeral 52, MBMS middleware is indicated with reference numeral 104, the DANE is indicated with reference numeral 11, the MBMS client is indicated with reference numeral 103, the RAN is indicated with reference numeral 106, the BM-SC is indicated with reference numeral 57 and the CDN is indicated with reference numeral 56.

It is noted that, in accordance with the present disclosure, the default content delivery network is related to the content received via the BM-SC and the secondary content delivery network is related to the content received via the CDN having reference numeral 56.

In a first step 201, the BM-SC 57 may perform a Service Announcement towards MBMS middleware 104 residing within a particular UE. Within this step, the MBMS Client 103 may receive the service announcement information which may contain:
- the manifest as generated by the Live Encoder & Packager
- a BroadcastAppService describing the representations which are available in broadcast, i.e. in a default content delivery network
- a UnicastAppService describing the representations which are available in unicast, i.e. in a secondary content delivery network.

In a second step 202, the BM-SC 57 may trigger the session start for the service, which enables the contents for the selected representations to be broadcasted over RAN 106. If the service is interested for the user, the MBMS Client 103 may receive the broadcasted contents and make them cached locally.

In a third step 203, the DASH player 52 may request, i.e. GET, the manifest from the MBMS client 103.

In a fourth step 204, the MBMS client 103 may include a SAND channel element in the manifest for the DANE address for setting up the SAND communication channel, and may return the updated manifest to the DASH player 52.

In a fifth step 205, the DASH player may perform a SAND capability exchange procedure with the DAN 11 based on the DANE address as it received during the fourth step 204.

In a sixth step 206, the DASH player 52 may sent a ManifestModificationRequest message to the DANE 11 for requesting a modification of said manifest.

In a seventh step, with the help of the MBMS Client 103, the DANE 11 may generate the resource base URIs for the representations based on the BroadcastAppService and UnicastAppService received in step 1, i.e. having reference numeral 201.

The DANE 11 may then return the resource base URIs to the DASH player 52 in a Manifest Modification Response, in an eight step 208.

In a ninth step 209, the DASH player 52 may modify, replace and/or extend the resource base URIs for the representations according to the information from Manifest Modification Response.

In a tenth step 210, the DASH player 52 may send a SAND message for MBMS operations to the DANE 11 to check the resource availability situation for the media segments it intends to fetch.

In an eleventh step 211, in case the UE is out of MBMS coverage 216, the DANE 11 may inform the DASH player 52 that the broadcast URIs defined in BroadcastAppService are unavailable and the unicast URIs defined in UnicastAppService are available.

In a twelfth step 212, the DASH player 52 may fetch the media segments from the CON 56 based on the unicast URIs for the selected representations.

When the UE inside MBMS coverage area 217, in Resource Status, the DANE 11 may inform the DASH player 52 that the broadcast URIs defined in BroadcastAppService are available and the unicast URIs defined in UnicastAppService are unavailable.

In that case, the ASH player 52 may fetch 215 the media segments from the MBMS Client 103 based on the broadcast URIs for the selected representations. MEMS Client returns the segment files to the DASH player 52 which are received in step 2.

Figure 5:
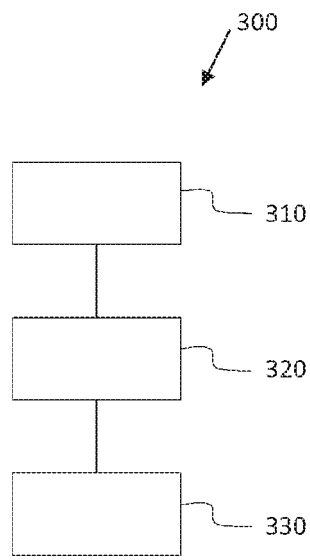
FIG. 5 discloses a flowchart illustrating an example of a method in accordance with the present disclosure.

FIG. 5 discloses a flowchart 300 illustrating an example of a method in accordance with the present disclosure.

The flow chart illustrates a method of enabling a Dynamic Adaptive Streaming over HTTP, DASH, player to fetch media segments from a network.

Figure 6:
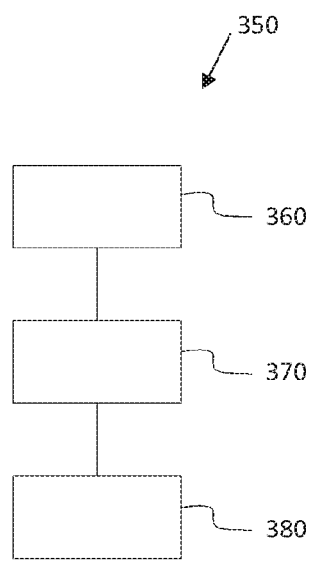
FIG. 6 discloses a flowchart illustrating another example of a method in accordance with the present disclosure.
Figure 7:
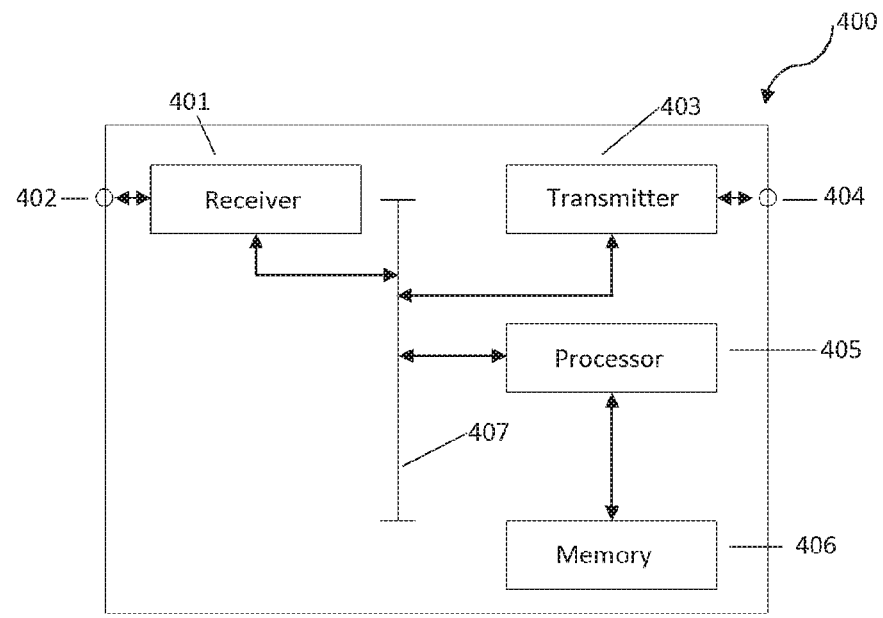
Figure 8:
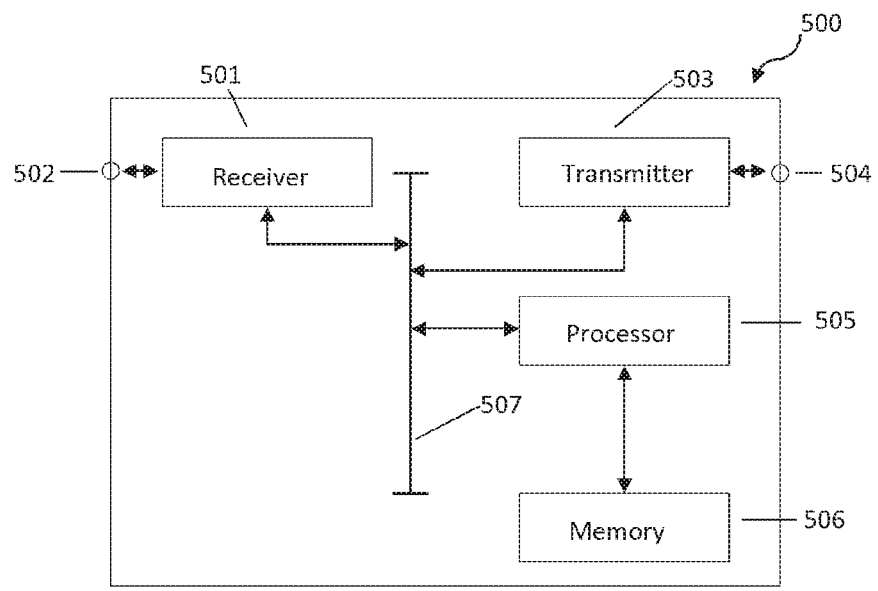

The method comprises the steps of:
- receiving 310, by a DASH Aware Network Element, DANE, middleware, from said network:
  - a manifest, wherein said manifest comprises a representation base Uniform Resource Identifier, URI, for indicating a location to said DASH player for fetching said media segments;
  - a default representation base URI which is available in a default mode for fetching said media segments from a default content delivery network, CDN;
  - a secondary representation base URI which is available in a secondary mode for fetching said media segments from a secondary CDN;
- transmitting 320, by said DANE middleware, said manifest to said DASH player, and
- transmitting 330, by said DANE middleware, to said DASH player, a ManifestModificationCommand message, wherein said ManifestModificationCommand message comprises one or more representation base URI's of any of said default representation base URI and said secondary representation base URI that are to modify a representation base URI in said manifest FIG. 6 discloses a flowchart 350 illustrating another example of a method in accordance with the present disclosure.

The flowchart 350 is directed to a method for a Dynamic Adaptive Streaming over HTTP, DASH, player to fetch media segments from a telecommunication network.

The method comprises the steps of:
- receiving 360, by said DASH player, from a DASH Aware Network Element, DANE, middleware:

a manifest, wherein said manifest comprises a representation base Uniform Resource Identifier, URI, for indicating a location to said DASH player for fetching said media segments;

receiving 370, by said DASH player, from said DANE middleware, a ManifestModificationCommand message comprising one or more representation base URI's of any of:

a default representation base URI which is available in a default mode for fetching said media segments from a default content delivery network, CDN;

a secondary representation base URI which is available in a secondary mode for fetching said media segments from a secondary CDN;

which default representation base URI or secondary representation base URI are to modify a representation base URI in said manifest.

modifying 380, by said DASH player, said representation base URI in said manifest based on said ManifestModificationCommand message.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of enabling a Dynamic Adaptive Streaming over HTTP (DASH) player to fetch media segments from a network, wherein said method comprises:
   receiving, by a DASH Aware Network Element (DANE) middleware, from said network:
      a manifest, wherein said manifest comprises a representation base Uniform Resource Identifier (URI) for indicating a location to said DASH player for fetching said media segments;
      a default representation base URI that is available in a default mode for fetching said media segments from a default content delivery network (CDN); and
      a secondary representation base URI that is available in a secondary mode for fetching said media segments from a secondary CDN;
   transmitting, by said DANE middleware, said manifest to said DASH player;
   transmitting, by said DANE middleware, to said DASH player, a ManifestModificationCommand message, wherein said ManifestModificationCommand message comprises one or more representation base URI's of any of said default representation base URI and said secondary representation base URI that are to modify a representation base URI in said manifest.

2. The method of claim 1, wherein said method further comprises the step of:
   receiving, by said DANE middleware, from said DASH player, a ManifestModificationRequest message for requesting a modification of said manifest.

3. The method of claim 1, wherein said DANE middleware comprises a Multimedia Broadcast Multicast Service (MBMS) client for receiving said manifest, said default representation base URI and said secondary representation base URI, wherein:
   said default representation base URI is a broadcast representation base URI which is available in a broadcast mode for fetching said media segments from a broadcast CDN; and
   said secondary representation base URI is a unicast representation base URI which is available in a unicast mode for fetching said media segments from a unicast CDN.

4. The method of claim 1, wherein said step of transmitting said manifest to said DASH player comprises defining a Server and Network Assisted DASH (SAND) channel between said DASH player and said DANE middleware.

5. The method of claim 4, wherein said step of defining comprises any of:
   defining a SAND channel based on HTTP GET transactions thereby enabling said DASH player to pull SAND messages from said DANE middleware;
   defining a SAND channel based on WebSockets thereby enabling said MBMS middleware to push messages to said DASH player.

6. The method of claim 1, wherein said method further comprises:
   receiving, from said DASH player, a SAND message for multi content delivery network operations for checking resource availability for said representation base URI in said manifest, and
   said method further comprises any of the steps of:
      informing said DASH player, by said DANE middleware, that said secondary representation base URI is available in case default mode is unavailable and secondary mode is available;
      informing said DASH player, by said DANE middleware, that said default base URI corresponding is available in case default mode is available.

7. A method for a Dynamic Adaptive Streaming over HTTP (DASH) player to fetch media segments from a telecommunication network, wherein said method comprises the steps of:
   receiving, by said DASH player, from a DASH Aware Network Element (DANE) middleware, a manifest, wherein said manifest comprises a representation base Uniform Resource Identifier (URI) for indicating a location to said DASH player for fetching said media segments;
   receiving, by said DASH player, from said DANE middleware, a ManifestModificationCommand message comprising one or more representation base URI's of any of:
      a default representation base URI which is available in a default mode for fetching said media segments from a default content delivery network (CDN);
      a secondary representation base URI which is available in a secondary mode for fetching said media segments from a secondary CDN;

which default representation base URI or secondary representation base URI are to modify a representation base URI in said manifest; and modifying, by said DASH player, said representation base URI in said manifest based on said ManifestModificationCommand message.

8. The method of claim 7, wherein said method further comprises the step of:

transmitting, by said DASH player, to said DANE middleware, a ManifestModificationRequest message for requesting a modification of said manifest.

9. The method of claim 7, wherein said step of receiving said manifest from said DANE middleware comprises defining a Server and Network Assisted DASH (SAND) channel between said DASH player and said DANE middleware.

10. The method of claim 9, wherein said step of defining comprises any of:

defining a SAND channel based on HTTP GET transactions thereby enabling said DASH player to pull SAND messages from said DANE middleware;

defining a SAND channel based on WebSockets thereby enabling said DANE middleware to push messages to said DASH player.

11. The method of claim 7, wherein said method further comprises the step of:

transmitting, by said DASH player, to said DANE middleware, a SAND message for multi content delivery network operations for checking resource availability for said representation base URI in said manifest, said method further comprises any of the steps of:

receiving, by said DASH player, from said DANE middleware, information that said secondary representation base URI is available in case default mode is unavailable and secondary mode is available;

receiving, by said DASH player, from said DANE middleware, information that said default representation base URI is available in case default mode available.

12. A User Equipment (UE) arranged for enabling a Dynamic Adaptive Streaming over HTTP (DASH) player to fetch media segments from a network, wherein said UE comprises DASH Aware Network Element (DASH) middleware comprising:

receive equipment arranged for receiving from said network:

a manifest, wherein said manifest comprises a representation base Uniform Resource Identifier (URI) for indicating a location to said DASH player for fetching said media segments;

a default representation base URI which is available in default mode for fetching said media segments from a default content delivery network (CDN);

a secondary representation base URI which is available in secondary mode for fetching said media segments from a secondary CDN;

transmit equipment arranged for transmitting said manifest to said DASH player, and for transmitting, to said DASH player, a ManifestModificationCommand message, wherein said ManifestModificationCommand message comprises one or more representation base URI's of any of said default representation base URI and said secondary representation base URI that are to modify a representation base URI in said manifest.

13. The UE of claim 12, wherein said receive equipment is further arranged for receiving, from said DASH player, a ManifestModificationRequest message for requesting a modification of said manifest.

14. The UE of claim 12, wherein said transmit equipment is further arranged for defining a Server and Network Assisted DASH (SAND) channel between said DASH player and said DANE middleware.

15. The UE of claim 14, wherein said transmit equipment is arranged for defining said SAND channel by:

defining a SAND channel based on HTTP GET transactions thereby enabling said DASH player to pull SAND messages from said DANE middleware;

defining a SAND channel based on WebSockets, thereby enabling said MBMS middleware to push messages to said DASH player.

16. The UE of claim 12, wherein said DANE middleware comprises a Multimedia Broadcast Multicast Service (MBMS) client for receiving said manifest, said default representation base URI and said secondary representation base URI, wherein:

said default representation base URI is a broadcast representation base URI which is available in a broadcast mode for fetching said media segments from a broadcast CDN;

said secondary representation base URI is a unicast representation base URI which is available in a unicast mode for fetching said media segments from a unicast CDN.

17. The UE of claim 12, wherein said receive equipment is further arranged for receiving, from said DASH player, a SAND message for multi content delivery network operations for checking resource availability for said representation base URI in said manifest, and wherein said DANE middleware further comprises inform equipment arranged for any of:

informing said DASH player that said secondary representation base URI is available in case default mode is unavailable and secondary mode is available;

informing said DASH player that said default representation base URI corresponding available in case default mode available.

18. A User Equipment (UE) arranged to fetch media segments from a network, said UE comprises a Dynamic Adaptive Streaming over HTTP (DASH) player which comprises:

receive equipment arranged for receiving, from a DASH Aware Network Element (DANE) middleware, a manifest, wherein said manifest comprises a representation base Uniform Resource Identifier (URI) for indicating a location to said DASH player for fetching said media segments;

wherein said receive equipment is further arranged for receiving, from said DANE middleware, a ManifestModificationCommand message comprising one or more representation base URI's of any of a:

a default representation base URI which is available in default mode for fetching said media segments from a default Content Delivery Network (CDN); and a secondary representation base URI which is available in secondary mode for fetching said media segments from a secondary CDN;

which one or more representation base URI's are to modify a representation base URI in said manifest; and modify equipment arranged for modifying said representation base URI in said manifest based on said ManifestModificationCommand message.

19. The UE of claim 18, wherein said UE further comprises transmit equipment arranged for transmitting, to said DANE middleware, a ManifestModificationRequest message for requesting a modification of said manifest.

20. The UE of claim 18, wherein said receive equipment is further arranged for receiving said manifest from said DANE middleware by defining a Server and Network Assisted DASH (SAND) channel between said DASH player and said DANE middleware.

21. The UE of claim 20, wherein said defining comprises any of:
   defining a SAND channel based on HTTP GET transactions thereby enabling said DASH player to pull SAND messages from said MBMS middleware;
   defining a SAND channel based on WebSockets, thereby enabling said MBMS middleware to push messages to said DASH player.

22. The UE of claim 18, wherein said UE comprises transmit equipment arranged for transmitting, to said DANE middleware, a SAND message for multi content delivery network operations for checking resource availability for said representation base URI in said manifest,
   and wherein said receive equipment is further arranged for receiving, from said DANE middleware, information that said secondary representation base URI is available in case secondary mode is unavailable and default mode is available;
   and wherein said receive equipment is further arranged for receiving, from said DANE middleware, information that said default representation base URI is available in case default mode available.

* * * * *

UNITED STATES PATENT AND TRADEMARK OFFICE
CERTIFICATE OF CORRECTION

PATENT NO. : 10,601,886 B2
APPLICATION NO. : 15/757586
DATED : March 24, 2020
INVENTOR(S) : Lohmar et al.

Page 1 of 2

It is certified that error appears in the above-identified patent and that said Letters Patent is hereby corrected as shown below:

In the Specification

In Column 1, Line 24, delete "through an" and insert -- through a --, therefor.

In Column 1, Line 50, delete "DANEs" and insert -- DANEs. --, therefor.

In Column 4, Line 58, delete "modifying," and insert -- Modifying, --, therefor.

In Column 6, Line 46, delete "any of a" and insert -- any of a: --, therefor.

In Column 6, Line 55, delete "modify" and insert -- Modify --, therefor.

In Column 6, Line 59, delete "for" and insert -- for: --, therefor.

In Column 7, Line 2, delete "HTTR" and insert -- HTTP --, therefor.

In Column 8, Lines 1-2, delete "content delivery network 57," and insert -- content delivery network 56, --, therefor.

In Column 8, Line 27, delete "network An" and insert -- network. An --, therefor.

In Column 8, Line 47, delete "EPC<107" and insert -- EPC 107 --, therefor.

In Column 8, Line 65, delete "DASH player 11" and insert -- DASH player 52 --, therefor.

In Column 9, Line 7, delete "DASH player 11" and insert -- DASH player 52 --, therefor.

In Column 9, Line 12, delete "DASh" and insert -- DASH --, therefor.

In Column 9, Line 19, delete "DAS player" and insert -- DASH player --, therefor.

Signed and Sealed this
Eighth Day of September, 2020

Andrei Iancu
*Director of the United States Patent and Trademark Office*

CERTIFICATE OF CORRECTION (continued)
U.S. Pat. No. 10,601,886 B2

In Column 10, Line 19, delete "CON 56" and insert -- CDN 56 --, therefor.

In Column 10, Line 21, delete "UE inside" and insert -- UE is inside --, therefor.

In Column 10, Line 26, delete "ASH player 52" and insert -- DASH player 52 --, therefor.

In Column 10, Line 28, delete "MEMS" and insert -- MBMS --, therefor.

In Column 10, Line 51, delete "player, and" and insert -- player; and --, therefor.

In Column 10, Line 58, delete "manifest" and insert -- manifest. --, therefor.

In Column 11, Line 18, delete "modifying 380," and insert -- Modifying 380, --, therefor.

In Column 11, Line 35, delete "Internet" and insert -- internet --, therefor.

In the Claims

In Column 14, Line 67, in Claim 19, delete "for" and insert -- for: --, therefor.